(12) United States Patent
Wang et al.

(10) Patent No.: US 10,616,043 B2
(45) Date of Patent: Apr. 7, 2020

(54) REAL-TIME PROBABILISTIC ROOT CAUSE CORRELATION OF NETWORK FAILURES

(71) Applicant: Google LLC, Mountain View, CA (US)

(72) Inventors: Xiang Wang, Mountain View, CA (US); Xin Zhao, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 110 days.

(21) Appl. No.: 15/822,459

(22) Filed: Nov. 27, 2017

(65) Prior Publication Data

US 2019/0165988 A1     May 30, 2019

(51) Int. Cl.
*H04L 12/24*     (2006.01)
*H04L 12/26*     (2006.01)

(52) U.S. Cl.
CPC .......... *H04L 41/064* (2013.01); *H04L 41/065* (2013.01); *H04L 41/0631* (2013.01); *H04L 41/12* (2013.01); *H04L 43/04* (2013.01); *H04L 41/069* (2013.01); *H04L 41/0636* (2013.01)

(58) Field of Classification Search
None
See application file for complete search history.

(56) References Cited

U.S. PATENT DOCUMENTS

| | | | | |
|---|---|---|---|---|
| 5,761,502 | A | * | 6/1998 | Jacobs ................ H04L 41/0631 |
| 7,509,229 | B1 | | 3/2009 | Wen |
| 10,230,603 | B2 | * | 3/2019 | Lad ....................... H04L 41/042 |

(Continued)

FOREIGN PATENT DOCUMENTS

| | | | | |
|---|---|---|---|---|
| EP | 2341434 A1 | * | 7/2011 | ......... G06F 11/0709 |
| EP | 2341434 A1 | | 7/2011 | |

(Continued)

OTHER PUBLICATIONS

Kandula, Srikanth, et al. "Shrink: A Tool for Failure Diagnosis in IP Networks" In Proceedings of the 2005 ACM SIGCOMM workshop on Mining network data, pp. 173-178, Aug. 22, 2005.

(Continued)

*Primary Examiner* — Ayaz R Sheikh
*Assistant Examiner* — Faiyazkhan Ghafoerkhan
(74) *Attorney, Agent, or Firm* — Lerner, David, Littenberg, Krumholz & Mentlik, LLP

(57) ABSTRACT

Various aspects of the subject technology related to systems and methods for performing real-time probabilistic root cause correlation. A system may be configured to receive network topology data from a plurality of external sources and generate a cross-layer network topology. The system may generate an event model based on the cross-layer network topology. The event model models the causal relationship between root causes and one or more observed failure events that are associated with one or more network entities. The system may receive a plurality of network event data for one or more network entities identified in the cross-layer network topology. The system may infer, using a trained Bayesian network, a root cause of at least one failure event indicated in the plurality of network event data based on the plurality of network event data and the generated event model. The system output the inferred root cause correlated to the failure event indicated in the plurality of network event data.

18 Claims, 8 Drawing Sheets

(56) References Cited

U.S. PATENT DOCUMENTS

| | | | |
|---|---|---|---|
| 2002/0019870 A1* | 2/2002 | Chirashnya | H04L 41/0681 709/224 |
| 2004/0002776 A1* | 1/2004 | Bickford | G05B 23/0275 700/30 |
| 2005/0091356 A1* | 4/2005 | Izzo | H04L 41/0604 709/223 |
| 2006/0041659 A1* | 2/2006 | Hasan | H04L 41/0631 709/224 |
| 2007/0239496 A1* | 10/2007 | Supatgiat | G06F 17/5009 703/2 |
| 2009/0327195 A1* | 12/2009 | Iscen | G06N 5/042 706/47 |
| 2011/0208680 A1* | 8/2011 | Bovey | G06N 7/005 706/12 |
| 2012/0151290 A1* | 6/2012 | Singh | G05B 23/0278 714/741 |
| 2015/0074035 A1 | 3/2015 | Narasappa | |
| 2017/0012848 A1* | 1/2017 | Zhao | H04L 41/145 |
| 2017/0250855 A1* | 8/2017 | Patil | H04L 47/827 |
| 2018/0241693 A1* | 8/2018 | Patil | H04L 47/827 |
| 2019/0116131 A1* | 4/2019 | Patil | H04L 47/827 |

FOREIGN PATENT DOCUMENTS

| | | | |
|---|---|---|---|
| EP | 2460105 B1 * | 10/2014 | |
| EP | 2460105 B1 | 10/2014 | |
| WO | 2008000290 A1 | 1/2008 | |
| WO | WO-2008000290 A1 * | 1/2008 | H04L 43/00 |

OTHER PUBLICATIONS

Marvasti, Mazda A., et al. "An Anomaly Event Correlation Engine: Identifying Root Causes, Bottlenecks, and Black Swans in IT Environments" VMware Technical Journal, vol. 2, No. 1, pp. 35-45, 2013.

Sole, Marc, et al. "Survey on Models and Techniques for Root-Cause Analysis" Jul. 3, 2017, retrieved from URL: https://arxiv.org/pdf/1701.08546.pdf.

Velasco, Fco. Javier Molinero. "A Bayesian Network approach to diagnosing the root cause of failure from trouble tickets" Artificial Intelligence Research, vol. 1, No. 2, pp. 75-85, Dec. 2012.

International Search Report and Written Opinion, dated Feb. 5, 2019 for PCT/US2018/062284.

\* cited by examiner

| Root Cause Correlation Tool | | | | | |
|---|---|---|---|---|---|
| File | Filter | Sort | Topology View | Import/Export | Help |
| Network Entity | Failure Type | Severity | Failure Probability | Root Cause | |
| Router_a:port0 | Port Down | High | 0.95 | ROADM 410a Down | |
| Router_b:port0 | NIC Down | Medium | 0.75 | ROADM 410b Down | |
| Router_c:port0 | Circuit Down | Low | 0.62 | Vendor Circuit 420 Down | |
| Router_d:port0 | Port Down | Low | 0.55 | Optical Span 415 Down | |

Figure 6A

REAL-TIME PROBABILISTIC ROOT CAUSE CORRELATION OF NETWORK FAILURES

BACKGROUND

Network monitoring involves observing the connectivity and operational status of network entities in a computer network. Network monitoring systems enable network owners and/or administrators to take corrective action when a network entity has failed or when a link connecting one or more network entities exhibits degraded transmission performance or failure. Typically, network monitoring systems include a configuration of monitors that are configured process network monitoring signals in order to detect and identify a variety of network failure event types. Upon detecting a failure event, a network monitoring system may be configured to generate data about the failure event, such as alerts or notifications, as well as data which may activate one or more redundant failover systems to mitigate or fix the observed failure event. Network failure events that are observed for a specific network entity, a collection of network entities or links connecting combinations entities may result in down-stream failures for the network entities or links that are connected to the specific network entity or link that failed. Identifying the root cause of a particular network failure event is valuable for understanding the nature and cause of the network failure so that preventative measures can be planned in advance for specific failure conditions to ensure that the network continues to operate as intended. Root causes may be correlated based on the topology of the network and the specific inter-connectedness of network entities operating in the network. The scale and complexity of modern network systems makes correlating root causes associated with failure events in real-time a non-trivial data analytics problem when considering the interdependencies of millions of network entities operating in different sub-networks, network layers, and/or domains.

SUMMARY

According to one aspect, the disclosure relates to a computer-implemented method for performing real-time probabilistic root cause correlation. The method includes receiving network topology data from a plurality of external sources and generating a cross-layer network topology. The method also includes generating an event model based on the generated cross-layer network topology. The event model models the causal relationships between root causes and one or more observed failure events that are associated with one or more network entities. The method includes receiving a plurality of network event data for the one or more network entities identified in the cross-layer network topology. The method also includes inferring, using a trained Bayesian network, a root cause of at least one failure event indicated in the plurality of network event data based on the plurality of network event data and the generated event model. The method outputting the inferred root cause correlated to the failure event indicated in the plurality of network event data.

In some implementations, the method includes indexing the received plurality of event data by event type, starting time, ending time, and/or one or more network entities that are associated with one or more failure events. In some implementations, the received plurality of network event data includes maintenance plan data or ticket system log data. In some implementations, the received plurality of network event data is fetched by a real-time event collector.

In some implementations, the event model is a bipartite causality graph. In some implementations, the method includes training the parameters of the Bayesian network using a maximum a posteriori estimation based on historical event data included in a second event model. In some implementations, the bipartite causality graph comprises multiple bipartite causality sub-graphs. In some implementations, each of the multiple bipartite causality sub-graphs is an independent Bayesian network. In some implementations, inferring each of the multiple bipartite causality sub-graphs is performed in parallel.

According to certain aspects of the present disclosure, a system for performing real-time probabilistic root cause correlation is provided. The system includes a memory storing computer-readable instructions, one or more event models, and/or one or more Bayesian networks. The system also includes one or more processors configured to execute the computer-readable instructions. The instructions, when executed cause the one or more processors to receive network topology data from a plurality of external sources and generate a cross-layer network topology. The one or more processors are further configured to generate an event model based on the generated cross-layer network topology. The event model models the causal relationships between root causes and one or more observed failure events that are associated with one or more network entities. The one or more processors are further configured to receive a plurality of network event data for the one or more network entities identified in the cross-layer network topology. The one or more processors are further configured to infer, using a trained Bayesian network, a root cause of at least one failure event indicated in the plurality of network event data based on the plurality of network event data and the generated event model. The one or more processors are further configured to output the inferred root cause correlated to the failure event indicated in the plurality of network event data.

In some implementations, the one or more processors are configured to index the received plurality of event data by event type, starting time, ending time, and/or one or more network entities that are associated with one or more failure events. In some implementations, the received plurality of network event data includes maintenance plan data or ticket system log data. In some implementations, the received plurality of network event data is fetched by a real-time event collector. In some implementations, the event model is a bipartite causality graph. In some implementations, the one or more processors are configured to train the parameters of the Bayesian network using a maximum a posteriori estimation based on historical event data included in a second event model. In some implementations, the bipartite causality graph comprises multiple bipartite causality sub-graphs. In some implementations, each of the multiple bipartite causality sub-graphs is an independent Bayesian network. In some implementations, the one or more processors are configured to infer each of the multiple bipartite causality sub-graphs in parallel. In some implementations, the one or more processors are configured to transmit or receive data asynchronously using publish-subscribe messaging. In some implementations, the one or more processors are configured to transmit or receive data asynchronously using periodic polling.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 6A and 6B are example user interfaces for displaying correlated root causes.

Figure 1:
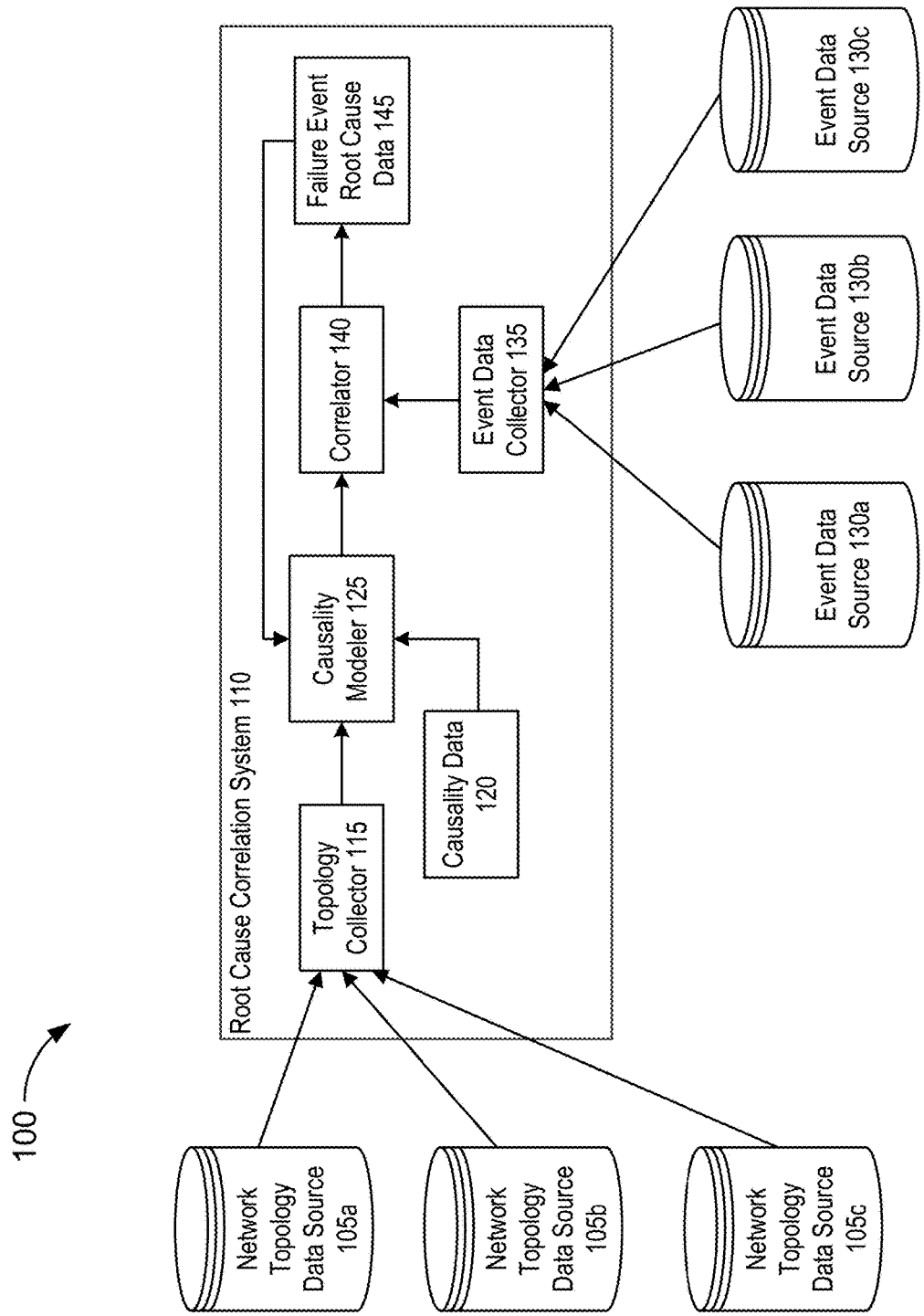
FIG. 1 illustrates an example functional block diagram of a system for performing real-time probabilistic root cause correlation.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

This disclosure generally relates to a system and method for determining root cause correlation for large-scale, dynamic, heterogeneous networks, e.g., in real-time or near real-time. A root cause represents an underlying failure that is associated with one or more observed network failure events. The observed events may be considered symptoms of the root cause. For example, network monitoring systems may generate signals or alarms indicating that some number of routers or links has gone down. The underlying failure, or root cause, associated with these symptoms may be a networking cable or optical fiber in a data center that was inadvertently cut or otherwise became inoperable subsequently causing the routers and router interfaces to fail.

As networks increase in size and complexity, the problem of rapidly assessing network failure events and identifying the probable root cause of the failure events can grow more burdensome. Real-time root cause correlation can involve evaluating the inter-dependency of large numbers of network entities in complex configurations often with disparate owners and operators in an immediate manner that does not require post-processing of the network monitoring data in order to ascertain the root causes that are associated with network failures. The dynamic nature of these networks means that the inter-dependency among the millions of network entities is constantly changing for newly added or faulty network entities. Typically network monitoring data can provide some insight when network monitors are consistently and broadly deployed throughout a network and are well-coordinated to perform the monitoring, but for such large-scale networks it is infeasible to deploy enough monitors to collect and process the amount of data that is required for a real-time probabilistic root cause correlation solution. As a result, the solution must robustly handle noisy, corrupted or missing signal data to accurately correlate root causes in real-time.

The disclosed system includes a number of components to determine root cause correlation in real-time for large-scale, dynamic, heterogeneous networks. The system includes a real-time topology collector. The real-time topology collector gathers the latest network topology from multiple, external data sources. The real-time topology collector parses the network topology data to generate a cross-layer network topology. The cross-layer network topology is a mapping of network entities and the directional mapping between any two entities. For example, a router may be one entity, while a router interface may be another entity, such that the router interface is a member of the router. The external data sources may include topology information that is gathered by other controllers in the network.

The system further includes a real-time causality modeler. The real-time causality modeler combines domain knowledge with the generated cross-layer network topology to derive an event model which includes a set of generalized rules identifying the specific causality that may exist between failed network entities. For example, the event model may describe that if a router circuit is down, then the router's interfaces will go down. Similarly, if a vendor circuit is down, then all the router circuits that are part of the vendor circuit will go down. The set of rules can be applied to the network topology to generate an event model as a bipartite causality graph that models the causal relationships between root causes and symptoms. The bipartite graph will identify the root causes that are associated with the observed symptoms (or network entities). Each node in the graph is a binary variable indicating the presence (or absence) of an observable event and each edge in the graph represents a causality relationship. In some cases, the nodes may represent hidden or latent variables that cannot be observed directly and must be inferred to determine the root cause.

The system further includes a real-time event collector. The real-time event collector collects network monitoring signals and relevant operational events related to network entity operation, such as maintenance plans or ticketing system logs and parses the inputs into a standard format of symptom events that can be exported for further processing. The events are indexed by event type, starting and ending times, and the network entity associated with the event. Additional information can also be attached to the event to assist root cause correlation.

The system also includes a real-time root cause correlator. The real-time root cause correlator receives the symptom event data and infers the most likely root cause based on the current bipartite causality graph provided by the real-time causality modeler using noisy or Bayesian inference. The real-time root cause correlator receives two inputs at any specific time point: the current bipartite causality graph and the current set of observed events. The current set of observed events is indexed so that they can be matched to the symptom nodes identified in the bipartite causality graph. Using a pre-trained noisy or Bayesian network, the real-time root cause correlator infers the set of most likely root causes that are correlated to the observed symptom events occurring at specific symptom nodes. The noisy or Bayesian network is built from the bipartite causality graph. The Bayesian network parameters are estimated asynchronously from the inference process using maximum a posteriori estimation based on historical failure data.

The disclosed solution can be applied to any network or large-scale system to infer root causes and the likelihood of the root causes in a real-time manner. The solution is robust to noisy signals and/or missing data and can be parallelized for greater scalability and more efficient operation. For example, in order to speed up the inference performed by the root cause correlator, the bipartite causality graph provided as input may be split into several connected sub-graphs. Each sub-graph may then become an independent Bayesian network such that inference may be applied to all sub-graphs in parallel. The parallel nature of the solution is further enhanced by the real-time communication occurring between the system components. For example, the various components may communicate asynchronously with each other using a publish-subscribe messaging paradigm. In this way components can publish updates in real-timer. As a fallback, the components can communicate with each other via periodic polling.

The system and method disclosed herein addresses the problem of performing probabilistic root cause correlation of network failure event data in real-time or near real-time. Accurately determining the root causes of network failure events in a probabilistic real-time manner is challenging in large-scale networks. The complex nature of these networks can lead to inherent uncertainty in precisely identifying the root cause that is associated with a particular failure event because the available network monitoring data may not cover all network entities of interest. In addition, the network monitoring data is often noisy, corrupt or may include missing values. The complexity of these networks can also mean there may be multiple potential root causes for particular symptoms (e.g., network failure events) that must be examined to determine the likelihood or probability that a given root cause may be accurately determined to be associated with one or more network failure events. Performing probabilistic root cause correlation in real-time may be difficult due to the need to process network entity dependency data, event dependency data, domain knowledge, live network monitoring data, and correlation data in real-time. Rule-based correlation systems do not address these problems because they fail to determine the likelihood or probability that a particular network failure event may be associated with a specific root cause and are not resilient to noisy or uncertain data inputs. In some cases, rule-based correlation systems may include hard-coded logic or rules and cannot learn from historical event data or adapt to observed event data. Temporal correlation systems identify network events that may happen at the same time but do not consider the causal relationships of the events. In addition, off-line correlation systems cannot perform processing of network event data for root cause correlation in real-time because data must be collected and subsequently processed off-line or in disparate processing systems that are separately configured from the network monitoring system where event data is actively being generated. As will be discussed in more detail below, processing network event data in real-time using probabilistic correlative methods, such as those described herein, can improve the accuracy and processing speed for determining correlated root causes that may be associated with observed network failure events.

Solutions to these problems may be achieved by the disclosed systems and methods whereby network monitoring data may be collected and processed in or near real-time in order to correlate root causes of network failure events in a probabilistic manner. The solution considers the topology of network entities and applies domain knowledge to the topology data to generate a causal relationship model between network entities and failure events based on historical event data. The causal relationship model becomes the basis for correlating root causes using noisy or Bayesian inferencing with the input of failure event data for newly observed network failures. The use of Bayesian inferencing methods in the disclosed system and method strengthen the correlation of root causes in a probabilistic manner and are robust to noisy or incomplete input data. In addition, the Bayesian inferencing methods can be applied to separate event models that may represent cross-network or cross-domain event dependencies for more efficient root cause inferencing and system scalability. The disclosed system and methods can be applied to any network as well as large-scale, non-network systems where it is desired to determine root causes associated with symptomatic events. In addition, the system can adapt to changes in network topology or changing causal relationships by learning from historical data. In addition, the disclosed systems and methods enable real-time, probabilistic root cause correlation of network failure event data in a way that may afford greater scalability and parallelization compared to traditional network monitoring and root cause correlation techniques or systems because the components of the system may be configured in a distributed architecture as will be described in relation to FIG. 2. The distributed architecture enables greater parallel processing of the large quantities of network failure event data that may be generated by larger, more complex networks. For example, the system and method enable faster inferencing by partitioning the causality graph into several independent Bayesian network components such that the inferencing of each can be performed in parallel. The increased scalability and parallel processing is achieved using asynchronous, real-time communication methods between the system components, such as publish-subscribe messaging or periodic polling between system components. By identifying the correlated root causes of network failure events in real-time, the system and method facilitate data-driven decision making regarding network infrastructure planning and network entity deployment. For example, the system and method may help network operators determine whether to acquire or build diverse fiber paths to increase network availability or how to implement strategic topology changes, such as adding or removing network nodes or entities.

FIG. 1 illustrates an example functional block diagram of a system 100 for performing real-time probabilistic root cause correlation. The system 100 includes a plurality of network topology data sources, shown as network topology data sources 105a-105c. The plurality of network topology data sources will each generally be referred to as a network topology data source 105 or collectively as network topology data sources 105. The system 100 also includes a root cause correlation system 110. The root cause correlation system 110 includes a topology collector 115, causality data 120, a causality modeler 125, a correlator 140, an event data collector 135, and failure event root cause data 145. The system 100 also includes a plurality of event data sources, shown as event data sources 130a-130c. The plurality of event data sources will each generally be referred to as an event data source 130 or collectively as event data sources 130.

As shown in FIG. 1, the system 100 includes a plurality of network topology data sources 105 that store network topology data. The network topology data sources 105 are sources of topology data corresponding to a plurality of network entities. The topology data stored in the network topology data sources 105 is received by the topology collector 115 of the root cause correlation system 110. The network topology data sources 105 may store network topology data that may be associated with one or more aspects of a network entities' connectivity, performance, and/or implementation. For example, the network topology data may identify data for and mappings between pairs of network entities that are related to layers of the open systems interconnection (OSI) model such as the physical layer (e.g., L1), the data link layer (e.g., L2), and/or the network layer (e.g., L3). In some implementations, the network topology data may include data that is specific to the internal configuration of the specific network entity such as the arrangement of ports and/or network interfaces. The network topology data may include data and control plane data. In some implementations, the network topology data may include historical network topology data. In some implementations, the network topology data may include information related to the links connecting one or more specific network entities as well as the ownership or operator of particular network entities or the links connecting the network entities.

In some implementations, the network topology data sources 105 may store network topology data that has been received from a plurality of external sources. For example, the network topology data may be associated with networks and network entities that are located remotely from the network topology data sources 105 and/or the root cause correlation system 110.

As further shown in FIG. 1, the system 100 includes a root cause correlation system 110. The root cause correlation system 110 includes multiple components that may be configured to perform real-time probabilistic root cause correlation for network failure events associated with the network entities identified in the network topology data received from the network topology data sources 105. In some implementations, the components may be implemented as independent services, for example on a virtual machine or within one or more containerized environments. The components may utilize asynchronous message passing techniques, such as a publish-subscribe paradigm to further enhance the parallel processing that the root cause correlation system 110 performs. In addition, the components of the system 110 may include multiple instantiations of a particular component in order to provide graceful, automatic failover and recovery in the event a particular component becomes unable to perform it's intended processing due to a hardware, software or network failure of the component computing device.

As shown in FIG. 1, the root cause correlation system 110 includes a topology collector 115. The topology collector 115 receives the network topology data from the network topology data sources 105 and prepares the data for anomaly detection and generates a cross-layer network topology. In some implementations, the topology collector 115 may fetch the network data from the network data sources 105 in order to generate the cross-layer network topology. In broad terms, the cross-layer network topology identifies the inter-connections that exist in or between the L1, L2, and L3 layers that are associated with all of the network entities identified in the network topology data for use in correlating the root causes of network failures in the entire network. The cross-layer network topology includes sets of network entities and the directional mapping between any pair of network entities. In some implementations, the network entities that are included in the network topology data and tracked by the topology collector 115 may include, but are not limited to, routers, linecards, dense wavelength division multiplexers (DWDMs), fibers, and circuits (including circuits that have been leased from external vendors). For example, the cross-layer network topology may include a router as a network entity. The router may be configured with one or more router interfaces that may also be represented as network entities. The cross-layer network topology may map the router interface network entities as member or members of the router network entity. The network topology can change frequently as network entities are added or removed from the network. To account for the dynamically changing configuration of the network topology, the topology collector 115 may store historical topology snapshots. In this way, the state of the network can be analyzed at specific time points. In some implementations, the network topology data may be received or fetched from the network topology data sources 105 periodically, such as every hour, day, or week.

As further shown in FIG. 1, the root cause correlation system 110 includes causality data 120. The causality data 120 includes data that may be provided by a domain expert and includes data describing the causal relationship between network entity failures and the expected symptoms (or the event which caused the network entity to fail). In some implementations, the causality data 120 includes one or more rules, which may be abstract rules. For example, the causality data 120 may include data, which may be defined as a rule, which indicates that if a router fails, it can be expected for all of the router's interfaces to also fail. Additionally, the causality data 120 may include data, which indicates that if an optical circuit goes down, then it can be expected that all the router circuits linked to the optical circuit will also go down. Similarly, the causality data 120 may indicate that if a vendor circuit fails, then the router circuit linked to the vendor circuit will also fail. The causality data 120 is provided to the causality modeler 125 to build an event model specifying the mapping between all potential network entity failures and their corresponding system events.

As shown in FIG. 1, the root cause correlation server 110 includes a causality modeler 125. The causality modeler 125 receives the cross-layer network topology generated by the topology collector 115 and also receives the causality data 120. In some implementations, the causality modeler may receive or fetch the causality data 120 at periodic intervals, such as every hour, day, or week. The causality modeler 125 generates an event model based on the received cross-layer network topology and the input of the received causality data 120. By applying the causality data 120 to the cross-layer network topology the causality modeler 125 may generate an event model. The event model is a set of generalized rules indicating the root causes that may be associated with network failure events (or symptoms). The event model models the relationships between root causes and one or more observed failure events that are associated with one or more network entities. In some implementations, the event model is a bi-partite causality graph. The bi-partite causality graph is a graph including nodes representing network failure events (e.g., a router failure or circuit failure-which may be root causes) and edges representing causality relationships between each and every network failure event in the network. The causality modeler 125 may create the event model such that each node is a binary variable representing the presence of an event and each edge is a causality relationship. The causality modeler 125 may also generate nodes for latent or hidden variables that require further processing to be inferred as network failure events. In some implementations, the bi-partite causality graph may include multiple bi-partite causality graphs that may be processed in parallel. In some implementations, each of the multiple bi-partite causality graphs may be an independent Bayesian network. The event model generated by the causality modeler 125 is received by the correlator 140.

As further shown in FIG. 1, the system 100 includes a plurality of event data sources, such as event data sources 130*a*-130*c*. The event data sources 130 store event data. The event data includes monitoring signals, alerts, alarms, or other data indicating the current or most recently observed network failure events for the network entities that are identified in the cross-layer network topology. The event data may be received from various sources including, but not limited to, maintenance plan data indicating when particular network entities are planned to be down or out of service due to maintenance, upgrade or administrative plans as well as ticket system log data which may indicate that one or more network entities are currently down due issues which require the network entity to be taken out of service. The event data may indicate the severity of the event, the type of event, and the network entities that are associated with the network failure event. The event data may also include the starting time of the network failure event and the ending time of the network failure event. In some implementations, the event data sources 130 may store event data that has been received from a plurality of external sources. For example, the event data may be associated with networks and network entities that are located remotely from the event data sources 130 and/or the root cause correlation system 110.

As further shown in FIG. 1, the root cause correlation system 110 also includes an event data collector 135. The event data collector 135 receives or collects the event data stored in event data sources 130 and may convert the data as necessary into network failure or symptom events. In some implementations, the event data collector 135 may receive or collect the event data in real-time or near real-time. For example, in some implementations, the event data collector may receive or collect event data periodically, such as every second, every 10 seconds, every 30 seconds, every minute, or every hour. The event data collector 135 may index the received event data by event type, event severity, event starting time, event ending time, and/or by one or more network entities that are associated with one or more network failure events identified in the event data. The event data collector 135 provides the event data to the correlator 140.

As shown in FIG. 1, the root cause correlation system 110 includes a correlator 140. The correlator 140 receives the event model generated by the causality modeler 125 and the event data generated by the event data collector 145. The correlator 140 is configured to implement learning-based correlation methods that enable evidence-based inferencing of root causes associated with network failure events. The correlator 140 may construct a Bayesian network based on the received event model and the received event data. The received event data is indexed to match the symptoms nodes indicated in the event model. The correlator 140 may then infer, using the Bayesian network, one or more root causes that may be most likely to explain the observed network failure events. The input parameters of the Bayesian network may be trained via unsupervised learning of historical symptom or network failure event data. For example, the parameters may be estimated or trained using a maximum a posteriori estimation (e.g., Gibbs sampling) based on the historical event data associated with a different event model. In some implementations, the input parameters of the Bayesian network may be trained asynchronously from the inferencing of failure event root causes that is also performed by the correlator 140. Additional details of the correlator 140's functionality will be described below in regard to FIGS. 5, 6A, and 6B.

As further shown in FIG. 1, the correlator 140 outputs the failure event root cause data 145. The failure event root cause data 145 may include the inferred root cause correlated to a network failure event that was indicated in the event data received from the event collector 145. In some implementations, the failure event root cause data 145 may be stored within the root cause correlation system 110. In some implementations, the root cause correlation system 110 may be configured to include a reporting sub-system (not shown) to receive or collect the failure event root cause data 145. The failure event root cause data 145 may be made available to users via one or more application programming interfaces (APIs) as well as graphical user interfaces (GUIs). In some implementations, the failure event root cause data 145 may be provided to the causality modeler 125 as training input in order to tune and enhance the causality relationships defined in the event model.

The system 100 shown and described in relation to FIG. 1 includes a root cause correlation system 110 which further includes a plurality of components and data sources. As shown in FIG. 1, the plurality of components and data sources in the root cause correlation system 110 are configured on a single server and may operate in parallel on the single server. As will be shown in FIG. 2, the plurality of components and data sources in the root cause correlation system 110 may also be configured in an arrangement including distributed servers in order to enhance the system's parallel processing performance for real-time probabilistic root cause correlation.

Figure 2:
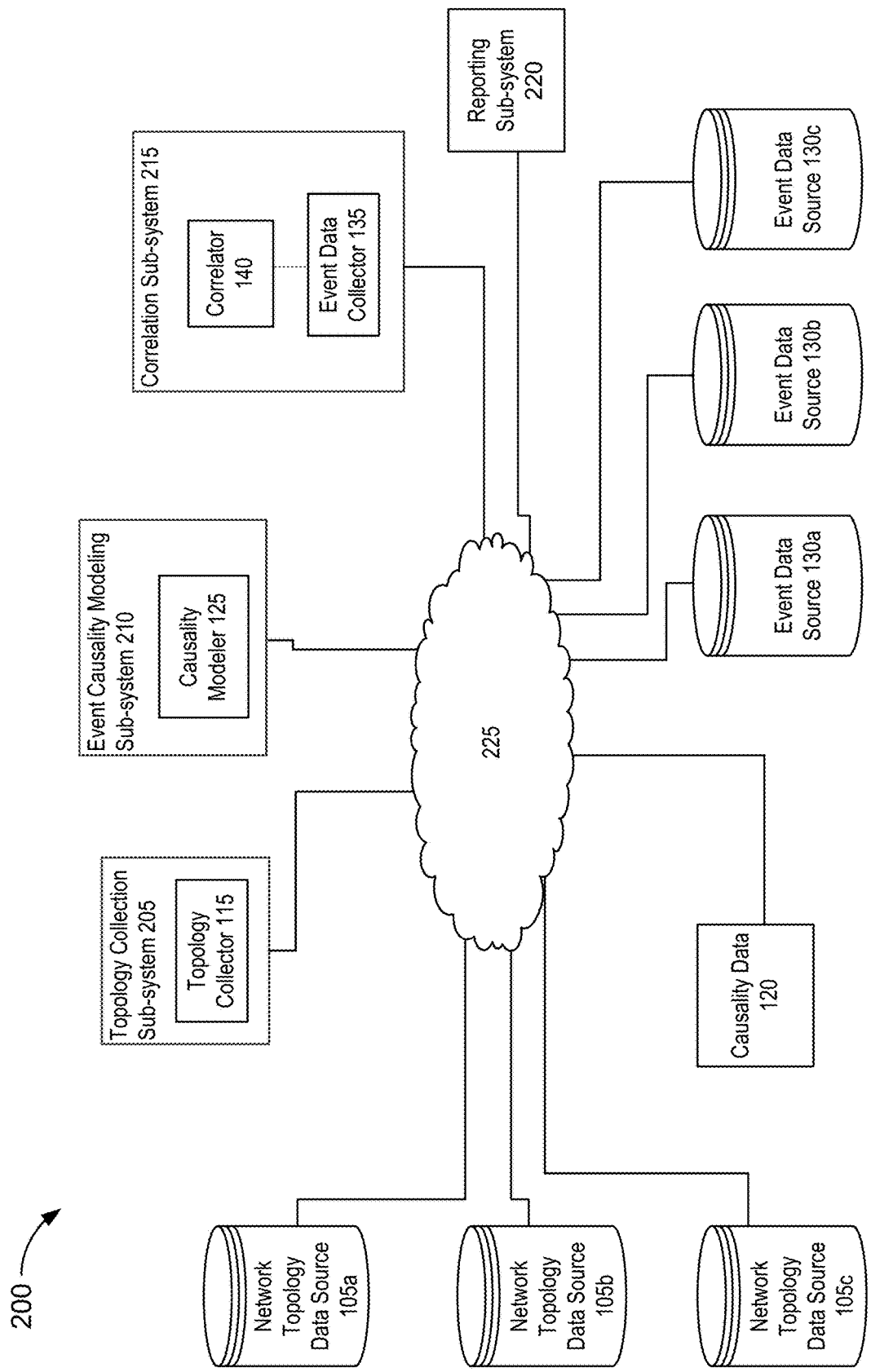
FIG. 2 illustrates an example architecture for performing real-time probabilistic root cause correlation in a distributed server architecture.

FIG. 2 illustrates an example distributed server architecture for performing real-time probabilistic root cause correlation. The architecture 200 includes similar components as described in relation to FIG. 1, however, the plurality of components and subsystems shown in FIG. 2 are arranged in a configuration of distributed servers that are connected via a network, instead of arranged within a single server as shown in FIG. 1. In addition, the architecture 200 includes a reporting sub-system 220 which was described but not shown relation to FIG. 1. The functionality of the individual components and sub-systems shown in FIG. 2 is identical to the functionality of the individual components and sub-systems shown in FIG. 1.

The architecture 200 shown in FIG. 2 includes network topology data sources 105, a topology collection sub-system 205. The topology collection sub-system 205 includes a topology collector 115. The architecture 200 also includes an event causality modeling sub-system 210. The event causality modeling sub-system 210 includes a causality modeler 125. The architecture 200 includes a correlation sub-system 215. The correlation sub-system 215 includes an event data collector 135 and a correlator 140. The architecture 200 includes a reporting sub-system 220, a network 225, causality data 125, and a plurality of event data sources 130.

As shown in FIG. 2, a plurality of network topology data sources, such as network topology data sources 105 described in relation to FIG. 1, are communicatively coupled to a network, such as the network 225. The network topology data sources 105 store network topology data associated with all network entities in a network of interest to be evaluated for probabilistic real-time root cause correlation. The stored network topology data may be transmitted over a network and received by the topology collection sub-system 205. The topology collection sub-system 205 includes a topology collector, such as the topology collector 115 described in relation to FIG. 1. The received network topology data is processed by the topology collector 115 to generate a cross-layer network topology.

As shown in FIG. 2, the architecture 200 includes an event causality modeling sub-system 210. The event causality modeling sub-system 210 includes a causality modeler 125. The cross-layer network topology generated by the topology collector may be received by the causality modeler 125. The causality modeler 125 may also receive causality data 125 and may generate an event model based on the received cross-layer network topology and the received causality data 125.

As further shown in FIG. 2, the architecture 200 includes a correlation sub-system 215. The correlation sub-system 215 includes an event data collector 135 and a correlator 140. The event data collector may receive event data from the plurality of event data sources 130 and provide the event data to the correlator 140. The correlator 140 may receive the event data in addition to the event model generated by the causality modeler 125 and may infer, using a trained Bayesian network, root causes of network failure events based on the received event data and the received event model. The correlator 140 may output the inferred root causes correlated to the network failure events indicated in the network event data.

As shown in FIG. 2, the architecture 200 includes a reporting sub-system 220. The reporting sub-system 220 may receive the inferred root causes that were output by the correlator 140 and provide the output root cause data to users via a programmatic interface such as an API or via a graphical interface such as a GUI. The reporting sub-system 220 may format the received root cause data according to the type of interface by which the user requested the root cause data. In some implementations the reporting sub-system 220 may store the output root cause data in memory or in a database configured within or external to the reporting sub-system 220 described in FIG. 2 or the root cause correlation system 110 shown in FIG. 1. Additional details of the reporting sub-system will be described later in relation to FIGS. 7A and 7B.

As shown in FIG. 2, the topology collection sub-system 205, the event causality modeling sub-system 210, the correlation sub-system 215, and the reporting sub-system 220 are configured on individual servers in a distributed server architecture 200. In some implementations, the network topology data sources 105, the causality data 120, and the event data sources 130 may also be configured on a separate servers. In some implementations, individual sub-systems and/or data sources described above may be combined on one or more servers. In some implementations, the individual sub-systems and/or data sources described above may be implemented individually or combined on one or more virtual machines. In some implementations, the individual sub-systems and/or data sources described above may be implemented individually or combined in one or more containerized environments. The individual sub-systems and/or data sources described above may be implemented in such a distributed architecture 200 to enable greater parallelization of the probabilistic root cause correlation processing that is performed by the components and sub-systems. In this way, the architecture 200 may enable greater scalability and increased processing capabilities than may be achieved in a non-distributed architecture. The distributed arrangement of the components and/or sub-systems as shown in FIG. 2 may also allow the probabilistic root cause correlation processing to occur at or near real-time execution speeds.

As further shown in FIG. 2, the architecture 200 includes a network 225. The network 225 can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like. The network 225 enables the communication of data to be processed by the distributed servers configured to perform real-time probabilistic root cause correlation.

Figure 3:
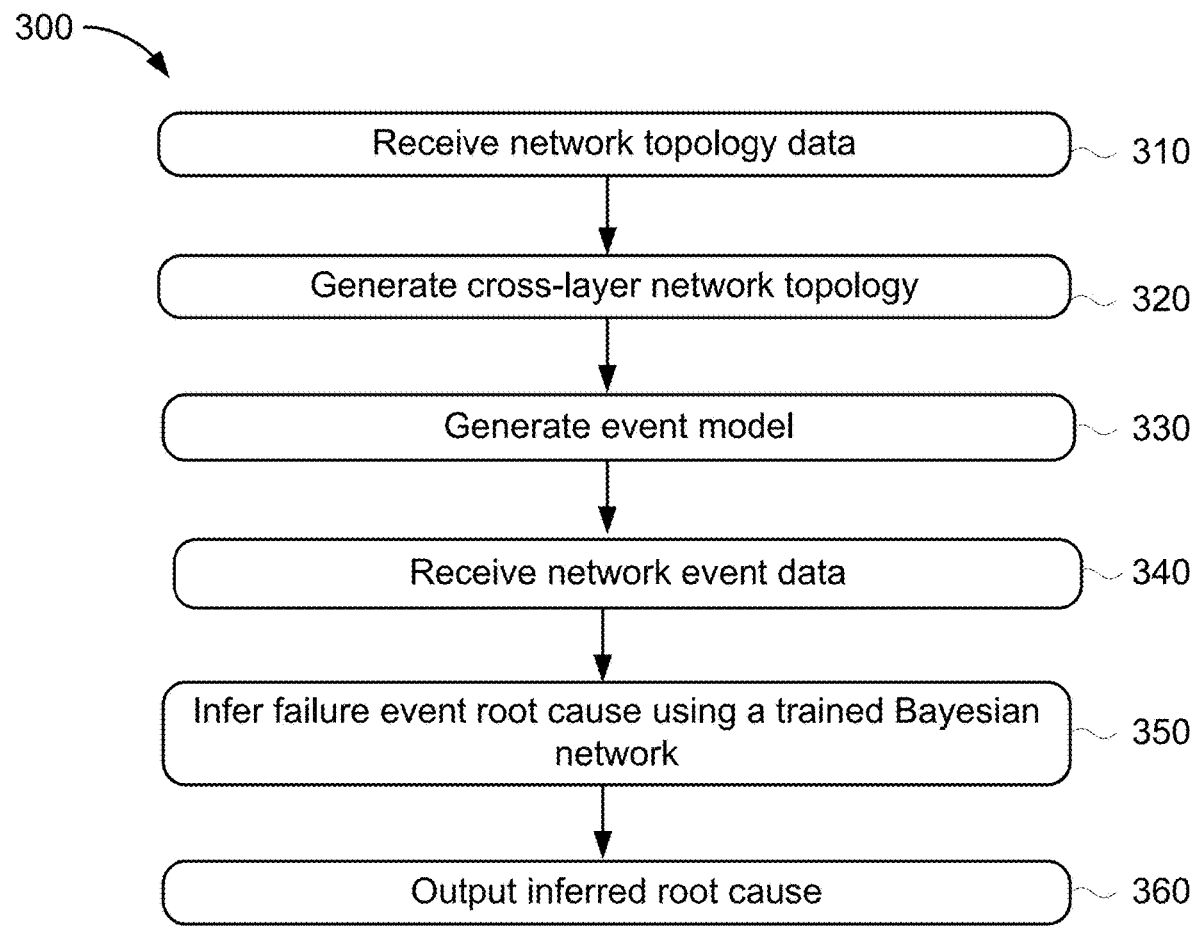
FIG. 3 is a flowchart showing an example method for performing real-time probabilistic root cause correlation.

FIG. 3 is a flow chart showing an example method 300 for real-time probabilistic root cause correlation performed by the components of the root cause correlation system 110 shown in FIG. 1. The method 300 includes receiving network topology data (stage 310). The method further includes generating a cross-layer network topology (stage 320) and generating an event model (stage 330). The method includes receiving network event data (stage 340) and inferring failure event root causes using a trained Bayesian network (stage 350). The method further includes outputting inferred root causes (stage 360).

At stage 310, the method 300 begins by the topology collector 115 receiving a plurality of network topology data, such as the network topology data that is stored in the network topology data sources 105 shown in FIG. 1. The plurality of received network topology data may include topology information for a particular network of interest to be evaluated for root cause correlation. The network topology data may identify the network entities within the network and the links connecting the identified network entities for all layers of the network. The network topology data may be received from one or more sources that are located external to the root cause correlation system 110.

At stage 320, the topology collector 115 generates a cross-layer network topology. The cross-layer network topology may be generated based on the received network topology data. The cross-layer network topology identifies the inter-connections that exist in or between all layers of the network that are associated with all of the network entities identified in the network topology data to be used for correlating the root causes of network failures in the entire network. The cross-layer network topology includes sets of network entities and the directional mapping between any pair of network entities.

At stage 330, the causality modeler 125 generates an event model. The causality modeler 125 may generate the event model based on the cross-layer network topology received from the topology collector 115 and the causality data 120. The event model is a set of generalized rules indicating the root causes that may be associated with network failure events (or symptoms) and models the relationships between root causes and one or more observed failure events that are associated with one or more network entities. The causality modeler 125 may generate the event model as a bi-partite causality graph. In some implementations, the causality modeler 125 may generate the event model as multiple bi-partite causality graphs. In some implementations, the causality modeler 125 may generate the event model as multiple bi-partite causality graphs such that each of the multiple bi-partite causality graphs are an independent Bayesian network. The generated event model is provided to the correlator 140 to be processed in conjunction with the network event data received by the event data collector 135.

At stage 340, the correlator 140 receives network event data. The network event data may be received or collected from the network event data sources 130 by the event data collector 135. The network event data may indicate one or more network entities identified in the cross-layer network topology. The event data collector 135 may provide the network data to the correlator 140. The correlator 140 may receive the network event data in conjunction with the event model generated in stage 330 to construct a pre-trained noisy or Bayesian network for each event model. The correlator 140 may then utilize the Bayesian network to infer correlated root causes for the network failure events indicated in the network event data.

At stage 350, the correlator 140 infers failure event root causes using the trained Bayesian network. The correlator 140 processes network event data using the Bayesian network to infer the most likely (or highest probability) root causes that can explain the observed network failure events indicated in the network event data. The method steps and processing details performed by the correlator 140 using the Bayesian network will be described below in relation to FIGS. 5, 6A, and 6B.

At stage 360, the correlator 140 outputs the inferred root causes. In some implementations, the inferred root causes may be stored in memory or a database that is configured as one or more components of the root cause correlation system 110. In some implementations, the inferred root causes or root cause data may be provided to or received by a reporting component, such as reporting sub-system 220 shown in FIG. 2. The reporting sub-system 220 may subsequently make the inferred root cause data available to users and/or other services via APIs and/or GUIs. Additional details of the functionality and processing performed by the reporting sub-system 220 on the output inferred root cause data will be described below in relation to FIGS. 7A and 7B.

Figure 4A:
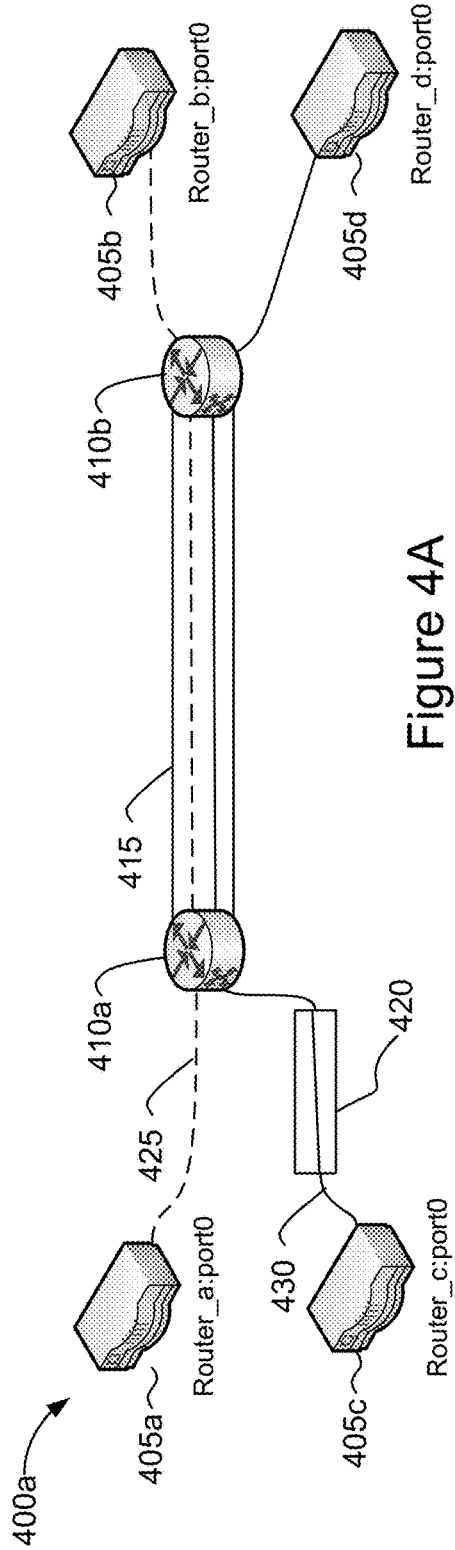
FIG. 4A is a network diagram showing an example architecture of network entities for which the root cause of associated failure events may be inferred by the method of FIG. 3.

FIG. 4A illustrates a network diagram showing an example architecture 400a of network entities for which the root cause of associated failure events may be inferred by the method of FIG. 3. The architecture 400a illustrates a network of multiple network entities which will be used to describe portions of the method shown in FIG. 3 in more detail. The architecture 400a includes a plurality of routers, such as routers 405a-405d. The plurality of routers 405a-405d will each generally be referred to as router 405 or collectively as routers 405. The architecture 400a also includes a plurality of reconfigurable optical add-drop multiplexers (ROADMs), such as ROADMs 410a and 410b. The plurality of ROADMs, such as ROADMs 410a and 410b will each generally be referred to as ROADM 410 or collectively as ROADMs 410. The architecture 400a includes a layer 1 optical link or optical span 415 connecting ROADMs 410a and 410b. The architecture 400a also includes a layer 3 vendor circuit 420 connecting router 405c to ROADM 410a. The architecture 400a includes router circuit 425 shown using a dashed line and router circuit 430 shown using a solid line.

A root cause correlation system, such as the root cause correlation system 110 shown in FIG. 1, may receive a plurality of network topology data associated with a network, such as the network shown by the network architecture 400a of FIG. 4A. The network topology data may indicate all of the network entities and links included in the network shown in FIG. 4A. The network topology data may be received by the topology collector 115 from one or more network data sources 105 as described in relation to stage 310 of FIG. 3. The network topology data may be used by the topology collector 115 to generate a cross-layer network topology as described in relation to stage 320 of FIG. 3. The generated cross-layer network topology may be provided to the causality modeler 125. The causality modeler 125 may receive the cross-layer network topology and generate an event model based on the cross-layer network topology and causality data 120 as described in relation to stage 330 of FIG. 3.

Figure 4B:
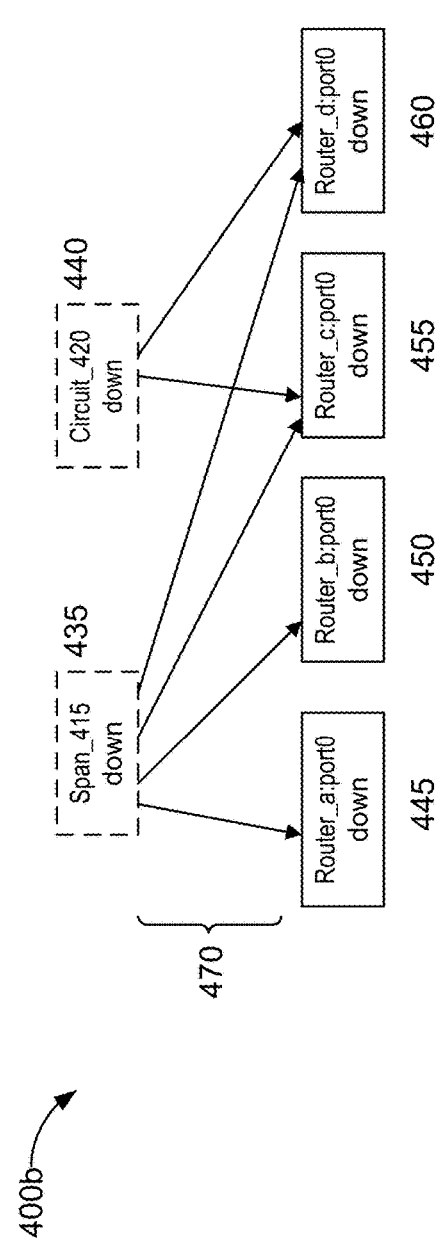
FIG. 4B is an event model generated by method stage 330 described in relation to FIG. 3 and corresponding to a portion of the network diagram shown in FIG. 4A.

FIG. 4B illustrates an event model 400b generated by method stage 330 described in relation to FIG. 3 and corresponding to a portion of the network architecture 400a shown in FIG. 4A. The event model 400b may be generated by the causality modeler 125 based on a portion of the network architecture 400a shown in FIG. 4A. To simplify the discussion of the generating the event model 400b, the portion of the network architecture 400a which includes the ROADMs 410 as network entities will be excluded.

As shown in FIG. 4B, the event model 400b includes two root cause nodes 435 and 440 shown as dashed line boxes and four symptom nodes 445, 450, 455, and 460 shown as solid line boxes. The event model 400b also includes a plurality of edges 470 connecting each root cause node to one or more symptom nodes. The event model 400b is a bi-partite graph generated by the causality modeler 125 based on applying the causality data 120 to the cross-layer network topology received from the topology collector 115 and generated for a portion of the network architecture 400a shown in FIG. 4A. The event model 400b indicates the specific root causes that may be associated with observed network failure events (or symptoms). For example, based on the causality data 120 and the cross-layer network topology, the causality modeler 125 determined that the event model 400b include an edge 470 between the root cause node 435 and each respective symptom nodes 445, 450, 455 and 460. This is because the causality data 120 and the cross-layer network topology indicated that a network failure event observed at any respective router 405 (e.g., symptom nodes 445, 450, 455 and 460) could be attributed to a failure of optical span 415 (e.g., root cause node 435). Similarly, based on the causality data 120 and the cross-layer network topology, the causality modeler 125 determined that the event model 400b include an edge 470 between the root cause node 440 and each respective symptom nodes 455 and 460. This is because the causality data 120 and the cross-layer network topology indicated that a network failure event observed at routers 405c and 405d (e.g., symptom nodes 455 and 460) could be attributed to a failure of vendor circuit 420 (e.g., root cause node 440). A network failure event or symptom at router 405a or 405b could not be attributed to the root cause of vendor circuit 420 failing because the network topology of network 400a indicates that routers 405a and 405b are not coupled to vendor circuit 420 and thus the root cause of routers 405a and 405b failing could not be due to the failure of vendor circuit 420. In this way the causality modeler 125 can generate an event model which associates root causes to network failure events for every network entity within a network of interest.

In addition, the causality modeler 125 may partition the event model 400b for parallel processing. For example, the event model 400b may be partitioned into two bi-partite causality sub-graphs, one indicating the causal relationships associated with routers 405c and 405d which would fail as a result of circuit 420 failing and a second bi-partite causality sub-graphs indicating the causal relationships associated with all routers 405*a*-405*d* which would fail as a result of optical span 415 failing.

Figure 5:
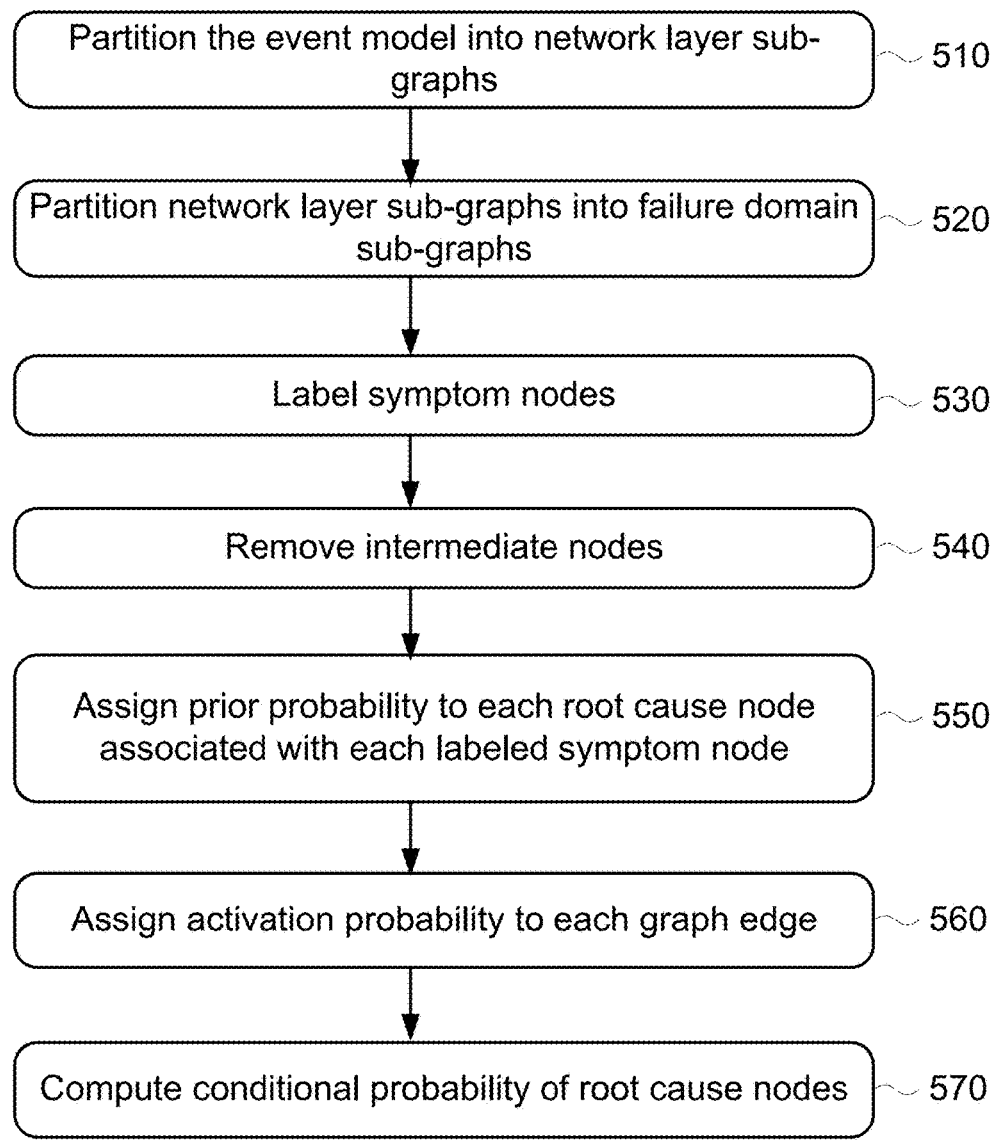
FIG. 5 is a flowchart showing an example method for inferring the root causes of failure events using a trained Bayesian network.

FIG. 5 is a flowchart showing an example method 500 for inferring the root causes of failure events using a trained Bayesian network. The method steps described in relation to FIG. 5 provide additional detail in regard to stage 350 of FIG. 3 performed by the correlator 140 of FIG. 1 upon receiving network event data and the event model generated by the causality modeler 125, also of FIG. 1. The method 500 includes partitioning the event model into network layer sub-graphs (stage 510) and portioning the network layer sub-graphs into failure domain sub-graphs (stage 520). The method also includes labelling symptom nodes (stage 530) and removing intermediate nodes (stage 540). The method includes assigning a prior probability to each root cause node associated with each labelled symptom node (stage 550). The method also includes assigning an activation probability to each graph edge (stage 560) and computing the conditional probability of root cause nodes (stage 570).

At stage 510, the method begins by the correlator 140 partitioning the event model into network layer sub-graphs. Upon receipt of the network event data and the generated event model, the correlator 140 may evaluate the event mode and partition or divide the event model into smaller sub-graphs associated with the network entities connections in specific network layers. For example, an event model may be generated for a network topology wherein the network entities communicate via multiple disparate network layers, the event model may include the links coupling those network entities via the various network layers. The correlator 140 may evaluate the event model to determine that separate event models could be generated for each network layer and the event model, represented as a bi-partite causality graph, would be partitioned into network layer sub-graphs respectively corresponding to the root causes and symptoms associated with the topology of network entities coupled via each network layer. Each network layer sub-graph may be represented as a bi-partite causality sub-graph for a particular network layer and may be further processed as an independent Bayesian network by the correlator 140. Thus, the correlator 140 may process one or more partitioned network layer sub-graphs in parallel to provide robust inferencing of network failure event root causes in a probabilistic real-time manner.

At stage 520, the correlator 140 partitions the network layer sub-graphs into failure domain sub-graphs. The correlator 140 may further process the network layer sub-graphs into separate failure domains. A failure domain is a logical association of network entities within a particular network layer that are affected by a network failure event at a network entity to which the other network entities may be connected. The failure domain sub-graph may provide additional context to a network failure event by indicating the collection of network entities operating in the same physical or logical regions or domains as the network entity that is directly associated with a root cause network failure event. By partitioning the network layer sub-graphs further into failure domain sub-graphs, the correlator 140 may perform parallel processing of the failure domain sub-graphs.

At stage 530, the correlator 140 labels the symptom nodes. The correlator 140 may further process the event model in the context of the event data received from the event data collector 135 shown in FIG. 1 and may label the symptom nodes with a binary variable indicating the symptom node is "ON" or otherwise active. In this way, the correlator 140 may infer, using a Bayesian network, which root cause nodes have the greatest likelihood or probability of triggering the activation of the symptom node.

At stage 540, the correlator 140 removes intermediate nodes. The correlator 140 processes the received event model to remove the intermediate nodes that are estimated to occur between root cause nodes and symptom nodes. By removing the intermediated nodes from the bi-partite causality graph representing the event model, the correlator 140 may reduce the number of inferencing steps to be performed and improve inferencing performance.

At stage 550, the correlator 140 assigns a prior probability to each root cause node associated with each labeled symptom node. The correlator 140 may process the received event model as a Bayesian network. The correlator 140 may infer the state of all the root cause nodes by performing a maximum a posteriori estimation. The correlator 140 may maintain the structure of network entities and connection represented in the event model and may assign a prior probability, represented for example as Pr(root cause), to each root cause node in the event model. In some implementations, the prior probability parameters of the Bayesian network, such as the Pr(root cause) for each root cause node may be learned from historical network event failure data using Gibbs sampling.

At stage 560, the correlator 140 assigns an activation probability to each graph edge. The correlator 140 may assign an activation probability, represented for example as Pr(activating symptom|root cause) to each edge in the event model connecting root cause nodes and network failure event nodes or symptom nodes. In some implementations, the activation probability parameters of the Bayesian network, such as the Pr(activating symptom|root cause) for each graph edge may be learned from historical network event failure data using Gibbs sampling.

At stage 570, the correlator 140 computes the conditional probability of root cause nodes. The correlator 140 may further process the event model to compute the conditional probability that a particular root cause (or root cause node) is activated based on the probability of the observed network failure events or symptoms, represented as Pr(root cause|symptoms). The correlator 140 may output the root causes with the highest probability to be "ON" as failures, along with the supporting network failure events or symptoms. The supporting symptom data may also include failure timing data indicating that the duration of the failure is determined by the start time and end time of the symptom events.

Figure 6B:
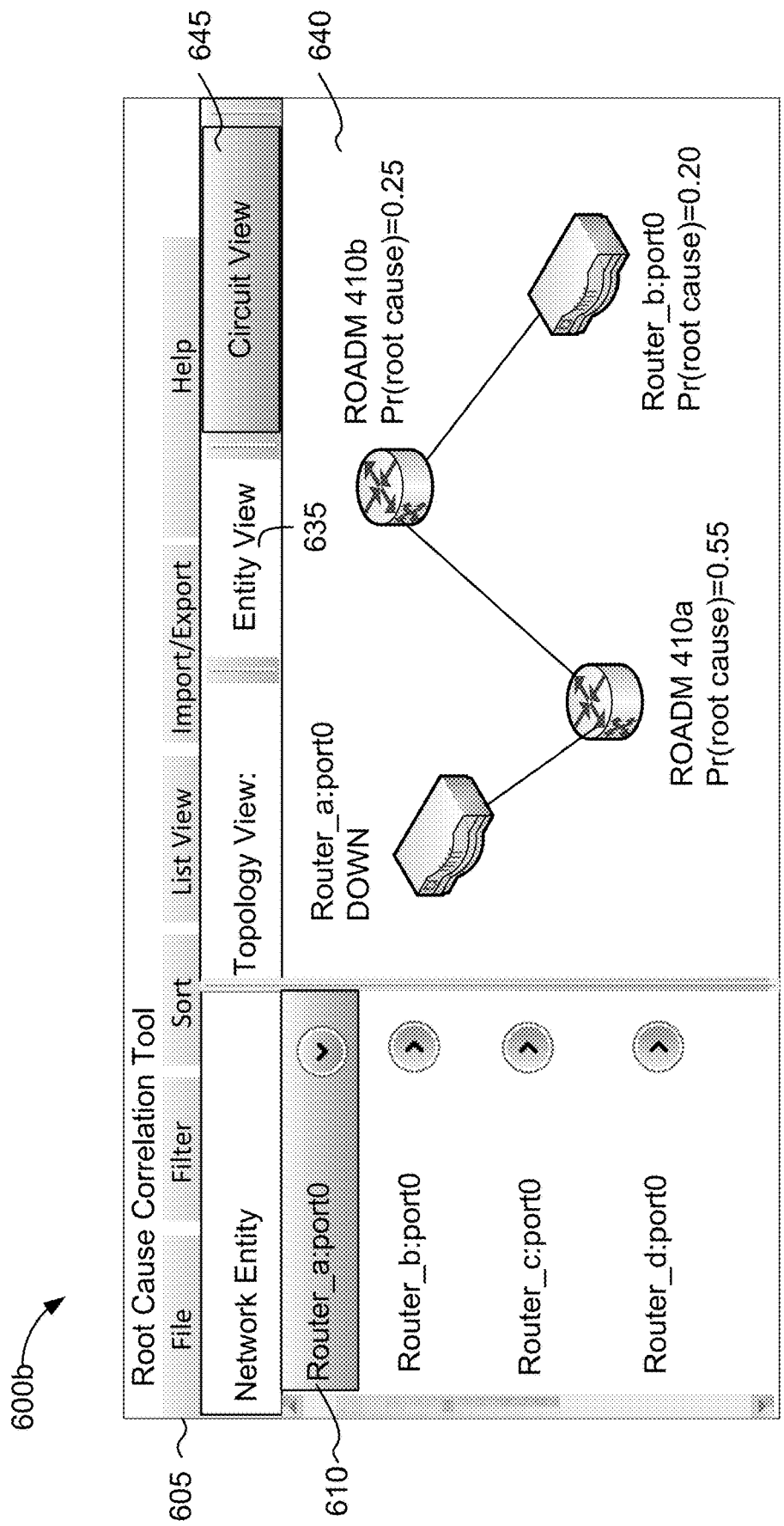

FIGS. 6A and 6B illustrate example user interfaces for displaying correlated root causes. In broad overview, the example user interfaces may present correlated root causes and root cause data that may be associated with one or more network failure events tied to the failure of one or more network entities within a network of interest. The user interfaces and root cause data presented therein and shown in FIGS. 6A and 6B may be examples of a network monitoring and analysis tool for performing real-time probabilistic root cause correlation for network failure events. Network administrators may utilize such tools to monitor network connectivity and/or network failure data in order to deploy new network topologies to mitigate the root cause of the observed network failure. Because the user-interfaces are associated with a real-time root cause correlation system with enhanced parallel processing capabilities, such as the root cause correlation system 110 shown in FIG. 1, network administrators can receive network monitoring data associated with network failure events more rapidly and thereby take action in regard to root cause failure events more quickly and efficiently.

FIG. 6A illustrates an example user interface 600a for displaying correlated root causes. The correlated root causes and root cause data indicated in the user interface 600a may be generated by the root cause correlation system 110 shown in FIG. 1, specifically by the correlator 140 of FIG. 1. In some implementations, the correlated root causes and root cause data indicated in the user interface 600a may be output by the correlator sub-system 215 and provided to the reporting sub-system 220 shown in FIG. 2 for access by or display to users. The user interface 600a may provide root cause data to users in a tabular format. User interface 600a includes a menu 605, a network entity indicator 610, failure type data 615, severity data 620, failure probability data 625, and root cause data 630.

As shown in FIG. 6A, the user interface 600a provides correlated root cause data in tabular format for display to a user. The user interface 600a includes a menu 605. The menu 605 may be similar to commonly used application menus and provides functionality for a variety of tasks to be performed in the application configures on a computing device. For example, the menu 605 includes a file sub-menu, a filter sub-menu, a sort sub-menu, a topology view sub-menu, an import/export sub-menu and a help sub-menu. Each sub-menu may further include a number of sub-menu selections that, when executed, perform various tasks related to the sub-menu functionality. For example, the filter sub-menu may allow users to filter the root cause data by network entity, failure probability, failure types, severity or root cause event. Upon selecting a filter condition, only the root cause data corresponding to the filter selections may be presented to the user. Similarly, upon selecting the topology view sub-menu, the user interface may display to the user a view of the root cause data in a network topology view instead of a view including root cause data formatted in a tabular view.

As further shown in FIG. 6A, the user interface 600a includes a network entity indicator 610. The network entity indicator 610 may identify the particular network entity associated with the root cause data. In this way, the user will be made aware of the specific network entity (e.g., port 0 of router 405a or "Router_a:port0" described in relation to FIG. 4A) that is associated with each determined root cause. The user interface 600a may include a scroll-able list of network entity indicators 610 and their associated root cause data.

As further shown in FIG. 6A, the user interface 600a includes failure type data 615. The failure type data 615 may include data indicating the type of failure experienced by the corresponding network entity based on the correlated root cause. For example, as shown in FIG. 6A, the network entity "router_a:port0" experienced a port down failure as a result of a root cause failure elsewhere in the network. A variety of failure type data may be provided to the user in the user interface 600a including, but not limited to, port failures, interface failures, power failures, circuit or link failures, as well as planned outages where the particular network entity may be down due to maintenance plans.

As further shown in FIG. 6A, the user interface 600a includes severity data 620. The severity data 620 may include data indicating the severity of the network entities failure due to the root cause failure. For example, as shown in FIG. 6A, the severity data 620 that is associated with the network entity "router_a:port0" port down failure indicates that the failure is a "High" severity failure. The severity settings and logic used to assign a particular severity setting to a failure event may be a user-configurable attribute of a root cause correlation system 110 and/or the user interface 600a. For example, severity levels may be associated with historic traffic levels through the network entity, priority of traffic passing through the network entity, the duration of a failure, or service level agreement requirements associated with end users coupled to the network entity or a connection thereof.

As shown in FIG. 6A, the user interface 600a includes failure probability data 625. The failure probability data 625 may include data indicating the probability that the indicated root cause was correlated to the network failure event observed at the indicated network entity. The failure probability data 625 indicates a likelihood or probability that may be represented as a percentage or as a data value. In some implementations the failure probability data 625 may include data values in a range between 0.0 and 1.0, where values closer to 1.0 indicate the strongest or highest probability that the root cause is correlated to the network entity failure event. Similarly, the failure probability data 625 may also include data values as percentages in a range between 0% and 100%, where values closer to 100% indicate the strongest or highest probability that the root cause is correlated to the network entity failure event. For example, as shown in FIG. 6A, the failure probability data 625 that is associated with the network entity "router_a:port0" port down failure indicates that there is a 0.95 or 95% probability that the identified root cause is correlated to the port down failure experienced at the "router_a:port0" network entity.

As further shown in FIG. 6A, the user interface 600a includes root cause data 630. The root cause data 630 may include data indicating the network entity that the root cause correlation system 110 has probabilistically determined in real-time to be correlated to the failure of the network entity indicated by the network entity indicator 610. For example, as shown in FIG. 6A, the root cause data 630 that is associated with the network entity "router_a:port0" port down failure indicates that the root cause is a failure at the "ROADM 410a" network entity. In some implementations, the root cause data 630 may also include data indicating the type of the root cause failure that occurred at the network entity determined to be the root cause of the failure that was experienced by the network entity indicated by the network entity indicator 610.

FIG. 6B illustrates an example user interface 600b for displaying correlated root causes. The correlated root causes and root cause data indicated in the user interface 600b may be generated by the root cause correlation system 110 shown in FIG. 1, specifically by the correlator 140 of FIG. 1. In some implementations, the correlated root causes and root cause data indicated in the user interface 600b may be output by the correlator sub-system 215 and provided to the reporting sub-system 220 shown in FIG. 2 for access by or display to users. The user interface 600b may provide root cause data to users in a graphical format. In some implementations the user interface 600b may present the root cause data to users in a format that includes a network topology. User interface 600b includes a menu 605 and a network entity indicator 610, similar to the same referenced elements shown in FIG. 6A. The user interface 600b shown in FIG. 6B also includes an entity view indicator 635 and a circuit view indicator 645. The user interface 600b also includes a display panel 640.

As shown in FIG. 6B, the user interface 600b provides correlated root cause data in a graphical format for display to a user. The graphical format may include one or more network topology views. The user interface 600b includes a menu 605. The menu 605 is identical to the menu 605 described in relation to FIG. 6A except that in the user interface 600b, the menu 605 may include a list view sub-menu instead of a topology view sub-menu. For example, upon selecting the list view sub-menu, the user interface may display to the user a view of the root cause data in a list view or tabular formatted view instead of a view including root cause data presented in a graphical or network topology view.

As further shown in FIG. 6B, the user interface 600b includes a network entity indicator 610. Upon selection by the user of a particular network entity indicator 610, the user interface 600b may shade, highlight or otherwise graphically annotate or denote the specific network entity as shown in FIG. 6B. The user interface 600b will present the user with the root cause data corresponding to the selected network entity indicator 610.

As shown in FIG. 6B, the user interface includes an entity view indicator 635. The entity view indicator 635 may, upon selection by the user (as shown in FIG. 6B), cause the user interface 600b to display the network topology of network entities which may be associated with the root cause of the failure experienced at the network entity associated with the selected network entity indicator 610. For example, in FIG. 6B, assume the user has selected to view the root cause data corresponding to network entity indicator 610 or "router_a:port0". Further assume the user has selected the entity view indicator 635. Upon selection of the entity view indicator 635, the user interface 600b may display a topological view of the network entities to which "router_a:port0" is coupled in the network and the root cause data that is associated with each of the network entities.

As further shown in FIG. 6B, the user interface 600b includes a display panel 640. The display panel 640 presents the user with a display of the network topology corresponding to the network entity selected via the network entity indicator 610. In some implementations, the display panel 640 may include data values, coloring, animations, sounds, icons, or other indicators to present the root cause data associated with each network entity in the topology view. For example, as shown in FIG. 6B, the display panel 640 includes a topological view of the network entities that are connected to "router_a:port0" and their corresponding root cause data. The topology view displayed in display panel 640 includes the network entities name and root cause data. A user can view the topology view and root cause data displayed in display panel 640 and determine that the root cause of the failure observed at "router_a:port0" is most likely to be associated with ROADM 410a because the failure probability of ROADM 410a is 0.55 (or 55%) and thereby the highest of any other network entity to which the "router_a:port0" is connected. In some implementations, the display panel 640 may enable a user select a particular network entity and upon selection of the particular network entity, the display panel 640 may display additional network performance data, operational status and/or root cause data related to the selected network entity or circuits connecting network entities.

As shown in FIG. 6B, the user interface 600b includes a circuit view indicator 645. The circuit view indicator 645 may, upon selection, cause the user interface 600b to display the network topology of circuits which may correspond to the root cause of the failure experienced at the network entity associated with the selected network entity indicator 610. For example, referring back to the network topology described in relation to FIG. 4B, the network entities where connected via an optical span 415 and a vendor circuit 420. The circuit view indicator 645 may, upon selection, cause the display 640 to present the user with a topology view based on the circuits, spans, or links connecting the network entities.

Figure 7:
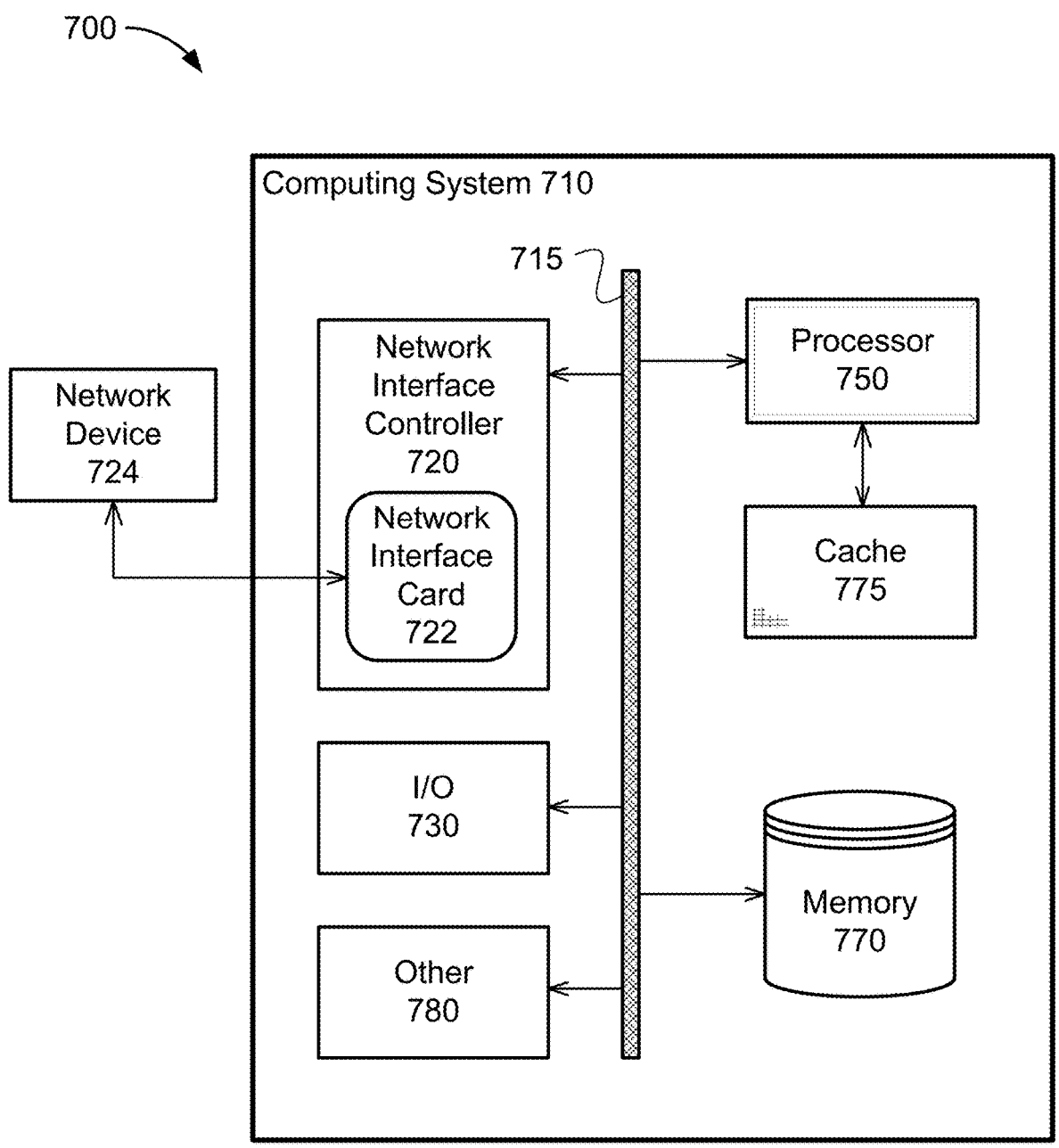
FIG. 7 is a block diagram of an example computing system.

FIG. 7 is a block diagram 700 illustrating an example computer system 710 with which the root cause correlation system 110 of FIG. 1 and also any components included therein, as well as the components or sub-systems of FIG. 2, can be implemented. In certain aspects, the computer system 710 may be implemented using hardware or a combination of software and hardware, either in a dedicated server, or integrated into another entity, or distributed across multiple entities.

In broad overview, the computing system 710 includes at least one processor 750 for performing actions in accordance with instructions and one or more memory devices 770 or 775 for storing instructions and data. The illustrated example computing system 710 includes one or more processors 750 in communication, via a bus 715, with at least one network interface driver controller 720 with one or more network interface cards 722 connecting to one or more network devices 724, memory 770, and any other devices 780, e.g., an I/O interface. The network interface card 722 may have one or more network interface driver ports to communicate with the connected devices or components. Generally, a processor 750 executes instructions received from memory. The processor 750 illustrated incorporates, or is directly connected to, cache memory 775.

In more detail, the processor 750 may be any logic circuitry that processes instructions, e.g., instructions fetched from the memory 770 or cache 775. In many embodiments, the processor 50 is a microprocessor unit or special purpose processor. The computing device 710 may be based on any processor, or set of processors, capable of operating as described herein. The processor 750 may be a single core or multi-core processor. The processor 750 may be multiple processors. In some implementations, the processor 750 can be configured to run multi-threaded operations. In some implementations, the processor 750 may host one or more virtual machines or containers, along with a hypervisor or container manager for managing the operation of the virtual machines or containers. In such implementations, the methods shown and described in FIGS. 3 and 5 can be implemented within the virtualized or containerized environments provided on the processor 750.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 710 may have any number of memory devices 770. In some implementations, the memory 770 supports virtualized or containerized memory accessible by virtual machine or container execution environments provided by the computing system 710.

The cache memory 775 is generally a form of computer memory placed in close proximity to the processor 750 for fast read times. In some implementations, the cache memory 775 is part of, or on the same chip as, the processor 750. In some implementations, there are multiple levels of cache 775, e.g., L2 and L3 cache layers.

The network interface driver controller 720 manages data exchanges via the network interface driver 722 (also referred to as network interface driver ports). The network interface driver controller 720 handles the physical and data link layers of the OSI model for network communication. In some implementations, some of the network interface driver controller's tasks are handled by the processor 750. In some implementations, the network interface driver controller 720 is part of the processor 750. In some implementations, a computing system 710 has multiple network interface driver controllers 720. The network interface driver ports configured in the network interface card 722 are connection points for physical network links. In some implementations, the network interface controller 720 supports wireless network connections and an interface port associated with the network interface card 722 is a wireless receiver/transmitter. Generally, a computing device 710 exchanges data with other network devices 724 via physical or wireless links that interface with network interface driver ports configured in the network interface card 722. In some implementations, the network interface controller 720 implements a network protocol such as Ethernet.

The other network devices 724 are connected to the computing device 710 via a network interface driver port included in the network interface card 722. The other network devices 724 may be peer computing devices, network devices, or any other computing device with network functionality. For example, a first network device 724 may be a network device such as a hub, a bridge, a switch, or a router, connecting the computing device 710 to a data network such as the Internet or network 225 shown in FIG. 2.

The other devices 780 may include an I/O interface, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 700 includes an additional device 780 such as a coprocessor, e.g., a math co-processor can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method for performing probabilistic root cause correlation, the method comprising:
   receiving network topology data from a plurality of external sources,
   generating, based on the received network topology data, a cross-layer network topology;
   generating, based on the generated cross-layer network topology, an event model, wherein the event model models causal relationships between root causes and one or more observed failure events that are associated with one or more network entities, the event model is a bipartite causality graph comprising multiple connected bipartite causality sub-graphs, each node in the bipartite causality graph and the multiple bipartite connected causality sub-graphs is a binary variable indicating the presence or absence of an observable event, and each edge in the bipartite causality graph and the multiple connected bipartite causality sub-graphs represents a causality relationship, wherein a first edge of a first bipartite causality sub-graph represents a causality relationship for a group of network entities and a second edge of a second bipartite causality sub-graph represents a causality relationship for a subset of the group of network entities;
   receiving a plurality of network event data for the one or more network entities identified in the cross-layer network topology;
   inferring, using a trained Bayesian network, a root cause of at least one failure event indicated in the plurality of network event data based on the plurality of network event data and the generated event model; and
   outputting the inferred root cause correlated to the failure event indicated in the plurality of network event data.

2. The method of claim 1, comprising training parameters of the Bayesian network using a maximum a posteriori estimation based on historical event data included in a second event model.

3. The method of claim 1, further comprising indexing the received plurality of event data by event type, starting time, ending time, and/or one or more network entities that are associated with one or more failure events.

4. The method of claim 1, wherein the received plurality of network event data includes maintenance plan data or ticket system log data.

5. The method of claim 1, wherein the received plurality of network event data is fetched by a real-time event collector.

6. The method of claim 1, wherein each of the multiple bipartite causality sub- graphs is an independent Bayesian network.

7. The method of claim 1, wherein inferring root causes of the at least one failure event is performed in parallel.

8. The method of claim 1, wherein the probabilistic root cause correlation is carried out in real-time.

9. The system of claim 1, wherein the computer-readable instructions and one or more processors are configured to carry out the probabilistic root cause correlation in real-time.

10. A system for performing probabilistic root cause correlation, the system comprising:
    a memory storing computer-readable instructions, one or more event models, and/or one or more Bayesian networks; and
    one or more processors, the one or more processors configured to execute the computer- readable instructions, which when executed carry out a method comprising:
    receiving network topology data from a plurality of external sources;
    generating, based on the received network topology data, a cross-layer network topology;
    generating based on the generated cross-layer network topology, an event model, wherein the event model models causal relationships between root causes and one or more observed failure events that are associated with one or more network entities, the event model is a bipartite causality graph comprising multiple connected bipartite causality sub-graphs, each node in the bipartite causality graph and multiple connected bipartite causality sub-graphs is a binary variable indicating the presence or absence of an observable event, and each edge in the bipartite causality graph and the multiple connected bipartite causality sub-graphs represents a causality relationship, wherein a first edge of a first bipartite causality sub-graph represents a causality relationship for a group of network entities and a second edge of a second bipartite causality sub-graph represents a causality relationship for a subset of the group of network entities;
    receiving a plurality of network event data for the one or more network entities identified in the cross-layer network topology;
    inferring, using a trained Bayesian network, a root cause of at least one failure event indicated in the plurality of network event data based on the plurality of network event data and the generated event model; and
    outputting the inferred root cause correlated to the failure event indicated in the plurality of network event data.

11. The system of claim 10, wherein the one or more processors are configured to train parameters of the Bayesian network using a maximum a posteriori estimation based on historical event data included in a second event model.

12. The system of claim 10, wherein the one or more processors are further configured to index the received plurality of event data by event type, starting time, ending time, and/or one or more network entities that are associated with one or more failure events.

13. The system of claim 10, wherein the received plurality of network event data includes maintenance plan data or ticket system log data.

14. The system of claim 10, wherein the received plurality of network event data is fetched by a real-time event collector.

15. The system of claim 10, wherein each of the multiple bipartite causality sub-graphs is an independent Bayesian network.

16. The system of claim 10, wherein inferring each of the multiple bipartite causality sub-graphs is performed in parallel.

17. The system of claim 10, wherein the one or more processors may transmit or receive data asynchronously using publish-subscribe messaging.

18. The system of claim 10, where in the one or more processors may transmit or receive data asynchronously periodic polling.

\* \* \* \* \*